United States Patent [19]

Okita et al.

[11] Patent Number: 4,788,103

[45] Date of Patent: Nov. 29, 1988

[54] MAGNETIC RECORDING MEDIUM

[75] Inventors: Tsutomu Okita; Kazuko Hanai; Yasuyuki Yamada, all of Kanagawa, Japan

[73] Assignee: Fuji Photo Film Co., Ltd., Kanagawa, Japan

[21] Appl. No.: 39,860

[22] Filed: Apr. 20, 1987

[30] Foreign Application Priority Data

Apr. 18, 1986 [JP] Japan ................................. 61-89510

[51] Int. Cl.$^4$ ............................................. G11B 5/702
[52] U.S. Cl. ............................... 428/425.9; 252/62.54; 427/128; 427/131; 428/328; 428/379; 428/694; 428/900
[58] Field of Search ...................... 428/694, 695, 425.9, 428/522, 900, 328, 329; 427/128, 131; 252/62.54; 360/134–136

[56] References Cited

U.S. PATENT DOCUMENTS

| | | | |
|---|---|---|---|
| 4,152,485 | 7/1979 | Mizumura | 428/425.9 |
| 4,411,957 | 10/1983 | Tokuda | 428/900 |
| 4,420,531 | 12/1983 | Tokuda | 428/900 |
| 4,521,486 | 6/1985 | Ninomiya | 428/900 |
| 4,529,661 | 7/1985 | Ninomiya | 428/900 |
| 4,613,545 | 9/1986 | Chubachi | 428/522 |
| 4,615,949 | 10/1986 | Yoda | 428/425.9 |
| 4,634,633 | 1/1987 | Ninomiya | 428/900 |
| 4,637,959 | 1/1987 | Ninomiya | 428/900 |
| 4,656,089 | 4/1987 | Ninomiya | 428/900 |
| 4,659,626 | 4/1987 | Fukushima | 428/900 |
| 4,666,784 | 5/1987 | Inukai | 428/900 |
| 4,686,145 | 8/1987 | Honda | 428/900 |

*Primary Examiner*—Ellis P. Robinson
*Attorney, Agent, or Firm*—Sughrue, Mion, Zinn, Macpeak & Seas

[57] ABSTRACT

A magnetic recording medium is described, comprising a non-magnetic support having provided thereon a magnetic layer containing ferromagnetic fine particles dispersed in a binder including a polyurethane resin containing (1) as a main polymer chain a polyester polyol containing an alcoholic and acid components comprising at least one of (A) at least one alcoholic component selected from alicyclic divalent alcohol and aromatic divalent alcohol in an amount of 50 mol % or more based on the total amount of alcoholic components or (B) at least one acid component selected from alicyclic dicarboxylic acid and aromatic dicarboxylic acid in an amount of 50 mol % or more based on the total amount of acid components, and (2) at least one polyisocyanate selected from tolylene diisocyanate, diphenyl-methane-4,4′-diisocyanate, isophrorone diisocyanate, dicyclohexylmethane-4,4′-diisocyanate, and p-phenylene diisocyanate in an amount of 5 mol % or more based on the total amount of all alcoholic components and all acid components, and further containing (3) a polar group selected from —SO$_3$M, —CO$_2$M, and —PO$_3$M$_2$, wherein M represents an H, Na, or K atom, in an amount of from 0.03 to 2 wt % based on the total amount of the polyurethane resin.

12 Claims, No Drawings

MAGNETIC RECORDING MEDIUM

FIELD OF THE INVENTION

The present invention relates to a binder used for a magnetic recording medium, and more particularly it relates to a binder having high dispersibility of ferromagnetic particles and excellent wear resistance.

BACKGROUND OF THE INVENTION

The polyurethane resins generally used for a magnetic recording medium include polyester polyurethane resins and polyether polyurethane resins, which are prepared by reacting polyester polyols or polyether polyols with diisocyanate compounds such as tolylene diisocyanate, 4,4'-diphenylmethane diisocyanate, hexamethylene diisocyanate, or methaxylylene diisocyanate using a urethanated reaction, as disclosed, for example, in Japanese Patent Application (OPI) No. 137522/81 (the term "OPI" as used herein means "unexamined published patent application"). The polyester polyols are obtained by reacting organic dibasic acids such as adipic acid, dimerized linolenic acid, maleic acid, or the like with glycols such as ethylene glycol, propylene glycol, butylene glycol or diethylene glycol, or polyhydric alcohols such as trimethylol propane, hexantriol, glycerine, trimethylol ethane, or pentaerythritol. The polyether polyols are obtained by reacting organic dibasic acids such as adipic acid, dimerized linolenic acid, maleic acid, or the like with propylene oxide or ethylene oxide.

However, when a conventional polyurethane resin is used as a binder for a magnetic recording medium, alcohol components are aliphatic compounds such as the above described glycols or polyhydric alcohols, and the glass transition point (Tg) of the thus obtained polyurethane resins is low. Accordingly, durability of a magnetic recording medium is insufficient.

Recently, higher image quality of a magnetic recording medium has been required. For this purpose, it is necessary to realize very close contact between a surface of a magnetic layer and a video head or an audio head, therefore it is desired to improve surface property of a magnetic recording medium, and to more strikingly improve dispersibility of ferromagnetic fine particles. However, conventionally known urethane resins show poor dispersibility for ferromagnetic particles, and fully satisfactory electromagnetic properties cannot be obtained. When a surface property of a magnetic layer is improved, the friction coefficient of a running system of a video tape recorder increases, thereby increasing running tension. Therefore, a magnetic recording medium must have high running durability even under such harsh conditions. In this connection, a magnetic recording medium having not only good surface property of a magnetic layer and good dispersibility of ferromagnetic fine particles, but also high running durability cannot be prepared in accordance with a conventional method. On the other hand, as a magnetic recording medium is in many cases stored for a long time after recording, a binder and the like having less deterioration of a magnetic recording medium during storage has been desired. However, conventionally used polyester polyurethane of the aliphatic type has not been satisfactory in this respect.

As a result of thorough investigation to overcome the defects of conventional techniques, the inventors of the present invention have attained the present invention.

SUMMARY OF THE INVENTION

An object of the present invention is to provide a magnetic recording medium homogeneously having characteristics such as (1) excellent electromagnetic properties, (2) excellent dispersibility of ferromagnetic fine particles, (3) excellent running properties, (4) excellent durability, (5) reduced deterioration during long term storage, and (6) good stability of a magnetic coating composition.

The above object can be attained by a magnetic recording medium comprising a non-magnetic support having provided thereon a magnetic layer containing ferromagnetic fine particles dispersed in a binder including a polyurethane resin containing (1) as a main polymer chain a polyester polyol containing an alcoholic and acid components comprising at least one of (A) at least one alcoholic component selected from group A as an alcoholic component in an amount of 50 mol% or more based on the total amount of alcoholic components or (B) at least one acid component selected from group B as an acid component in an amount of 50 mol% or more based on the total amount of acid components, and (2) at least one polyisocyanate selected from group C in an amount of 5 mol% or more based on the total amount of all alcoholic components and all acid components, and further containing (3) a polar group selected from group D in an amount of from 0.03 to 2 wt% based on the total amount of the polyurethane resin:

group A:
alicyclic divalent alcohol, aromatic divalent alcohol
group B:
alicyclic dicarboxylic acid, aromatic dicarboxylic acid
group C:
tolylene diisocyanate, diphenylmethane-4,4'-diisocyanate, isophorone diisocyanate, dicyclohexylmethane-4,4'-diisocyanate, p-phenylene diisocyanate
group D:
$-SO_3M$, $-CO_2M$, $-PO_3M_2$, wherein M represents an H, Na, or K atom

DETAILED DESCRIPTION OF THE INVENTION

The features of the present invention, obtained by incorporating the urethane resins having the above-described particular structure into a binder, include (1) dispersibility of ferromagnetic particles is strikingly improved, (2) electromagnetic properties are improved, and not only (3) running property and (4) durability, but also (5) long term storage stability are improved.

The alcoholic component represented by group A is alicyclic divalent alcohol and/or aromatic divalent alcohol. The specific examples thereof include 2,5-dihydroxyhexene, 3-cyclohexane-1,2-diol, cyclohexane-1,3-diol, cyclohexane-1,4-diol, cyclohexane-1,4-dimethanol, cyclohexane-1,3-dimethanol, 1,4-di(hydroxyethoxy)cyclohexane, 2,2-bis(4-hydroxycyclohexyl)propane, bis(4-hydroxycyclohexyl)methane, 2,2-bis(4-hydroxyethoxycyclohexyl)propane, 2,2-bis(4-hydroxyethoxy-phenyl)propane, 2,2-bis(4-hydroxyethoxythoxy-phenyl)propane, 2,2-bis(4-hydroxyethoxyphenyl)methane, 2,2-bis(4-hydroxyethoxyethoxyphenyl)methane, and the like. Among those, cyclohexane-1,4-diol, cyclohexane-1,4-dimethanol, and 2,2-bis-(4-hydroxyethoxy-phenyl)propane are preferred.

The acid component represented by group B is alicyclic dicarboxylic acid and/or aromatic dicarboxylic acid. The specific examples thereof include hexahydrophthalic acid, tetrahydrophthalic acid, 1-carboxylate-7-methylenecarboxylate norbornane, 2,6-dicarboxylate-14H naphthalene, phthalic acid, isophthalic acid, terephthalic acid, naphthalene dicarboxylic acid, bismethylene carboxylatebenzene, p,p'-biphenyldicarboxylate, 2,2'-bis(4-carboxy-phenyl)propane, 3,6-endomethylene 1,2,3,6-tetrahydrophthalic acid, etc. Among those, hexahydrophthalic acid, tetrahydrophthalic acid, phthalic acid, isophthalic acid, and terephthalic acid are preferred.

It is necessary that at least one of the alcoholic component and acid component of the polyester polyol in the urethane resin of the present invention contains the above-described alcohols or acids in an amount of 50 mol% or more, and preferably 70 mol% or more, based on a total amount of all alcoholic components or a total amount of all acid components, respectively. When the predetermined acid component and/or alcoholic component is used in an amount of 50 mol% or less, due to increase of viscosity of the binder, the friction coefficient increases and running durability deteriorates, which are unfavorable. S/N (the signal/noise ratio) tends to deteriorate, too. The following aliphatic divalent alcohols can be used as divalent alcohol in an amount of 50 mol% or less.

The aliphatic divalent alcohol includes ethylene glycol, trimethylene glycol, tetramethylene glycol, pentamethylene glycol, hexamethylene glycol, heptamethylene glycol, octamethylene glycol, nonamethylene glycol, decamethylene glycol, diethylene glycol, triethylene glycol, tetraethylene glycol, 2,2-dimethylpropane-1,3-diol, 2,2-diethylpropane-1,3-diol, 2-n-butyl-2-ethylpropane-1,3-diol, propane-1,2-diol, butane-2,3-diol, 2-ethylbutane-1,4-diol, 2-methylpentane-2,4-diol, 3-methylpentane-2,4-diol, and 2,2,4-trimethylpentane-1,3-diol. The following compounds can be used in an amount of 50 mol% or less as a dibasic acid. They are oxalic acid, malonic acid, succinic acid, glutaric acid, adipic acid, sebacic acid, azelaic acid, dodecanedioic acid, maleic acid, fumaric acid, itaconic acid, trimethyl adipic acid, methylene glutaric acid, ethyl malonic acid, methyl maleic acid, and methyl fumaric acid. Alcohols and acids having three or more functional groups can be also used, in an amount of 5 mol% or less.

The isocyanate component represented by group C of the polyurethane resin of the present invention includes tolylene diisocyanate, diphenylmethane-4,4'-diisocyanate, isophorone diisocyanate, dicyclohexylmethane-4,4'-diisocyanate, and p-phenylene diisocyanate. Among these, the preferable isocyanate component includes tolylene diisocyanate, diphenylmethane-4,4'-diisocyanate, and isophorone diisocyanate. The amount of isocyanate component is 5 mol% or more, preferably from 10 mol% to 30 mol%, and particularly preferably from 10 mol% to 20 mol%, based on the total amount of all alcoholic components and all acid components.

The polar group component represented by group D includes $-SO_3M$, $-CO_2M$, and $-PO_3M_2$, wherein M represents an H, Na, or K atom. Among these, $-SO_3Na$, $-SO_3K$, and $-CO_2H$ are preferred. The methods of introducing these groups comprise (1) introducing these polar groups beforehand to alcoholic components or acid components which are materials for the polyester polyol of the urethane resin of the present invention (for example, tribasic salt such as trimellitic acid, pyromelitic acid or methylcyclohexene tricarboxylic acid, and dibasic acid having metal salt of sulfonic acid such as 5-sodium sulfoisophthalic acid or 2-sodium sulfoterephthalic acid are used as a part of acid components) and (2) reacting a reaction product of a hydroxyl compound having a polar group and a diisocyanate compound, with an active hydrogen of the polyurethane resin of the present invention. Other introducing methods can also be employed. The polar group content is from 0.03 to 2 wt%, preferably from 0.05 to 1.5 wt%, and more preferably from 0.08 to 1.2 wt%, based on the total amount of the polyurethane resin. Dispersibility of ferromagnetic particles becomes deteriorated outside of the above range. The number average molecular weight is generally from 20,000 to 200,000, preferably from 30,000 to 150,000, and more preferably from 40,000 to 100,000. When the molecular weight is less than the above range, durability deteriorates. When the molecular weight is more than the above range, the viscosity of a magnetic coating composition becomes too high and dispersibility also becomes deteriorated.

In addition to the polyurethane resin of the present invention, the binder component of the present invention further includes a polyurethane resin having different structure from the polyurethane resin of the present invention, copolymers such as copolymer of vinyl chloride type, copolymer of vinyl chloride and vinyl acetate type, copolymer of vinyl chloride and vinyl propionate type, or copolymer of vinylidene chloride and vinyl acetate type, thermoplastic resins such as cellulose nitrate, cellulose acetate propionate, or cellulose acetate butylate, and polyfunctional polyisocyanate (for example, adducts of trimethylolpropane with three tolylene diisocyanates and polymethylene polyphenyl isocyanate, and the like), which can be used in mixture.

It is preferred that polyurethane of the present invention is used in an amount of 20 wt% or more, preferably from 35 wt% to 80 mol%, and particularly preferably from 35 wt% to 60 wt%, based on the total binder components.

The ferromagnetic fine particles which can be used in the present invention include ferromagnetic iron oxide particles, Co-doped ferromagnetic iron oxide particles, ferromagnetic chromium dioxide particles, ferromagnetic alloy particles, barium ferrite, etc. Preferred ferromagnetic iron oxide, ferromagnetic alloy particles, and chromium dioxide have an acicular ratio of from about 2/1 to 20/1, and preferably 5/1 or more, and an average length of from 0.2 to 2.0 μm. The ferromagnetic alloy particles have metal content of 75 wt% or more based on the total amount of ferromagnetic alloy particles, and 80 wt% or more of the metal content in the ferromagnetic alloy particles is ferromagnetic metal (i.e., Fe, Co, Ni-Fe, Co-Ni, Fe-Co, and Ni). Ferromagnetic chromium dioxide particles are the most effective in the present invention. Sb, Te, Sn, Ru, P, and W and the compound thereof can be added to $CrO_2$ to adjust coercive force thereof, and Fe, Ru, S, P, F, V, Mn and V-Ni and the compound thereof can be added to $CrO_2$ to adjust the Curie point thereof.

The organic solvents used upon dispersing and coating aa magnetic coating composition include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; ethers such as ethyl ether, glycol dimethyl ether, glycol monoethyl ether, dioxane, or tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin, or dichlorobenzene.

Additives such as a lubricating agent, an abrasive agent, a dispersing agent, an antistatic agent, an anticorrosive agent, or the like can be added to the magnetic coating composition of the present invention. The lubricating agents include saturated and unsaturated higher fatty acids, fatty acid ester, higher fatty acid amide, and higher alcohols, having 12 or more carbon atoms, silicone oil, mineral oil, vegetable oil, and fluorine type compounds. These lubricating agents can be added upon preparing a magnetic coating composition or can be coated directly or sprayed on the surface of a magnetic layer with or without organic solvents after drying or after smoothing treatment.

The materials for a support to be coated with a magnetic coating composition include polyesters such as polyethylene terephthalate, or polyethylene 2,6-naphthalate; polyolefins such as polyethylene or polypropylene; cellulose derivatives such as cellulose triacetate; plastics such as polyarbonate, polyimide, or polyamide imide; non-magnetic metals such as aluminum, copper, zinc, or tin and the alloys thereof; and plastics vapor-deposited with metals such as aluminum, depending upon the purpose of using a magnetic recording medium.

The shape of a non-magnetic support can be any one of a film, a tape, a sheet, a disk, a card, or a drum and the material of a non-magnetic support can be determined upon its shape.

A backing layer can be provided on the surface of a support opposite to a magnetic layer in order to prevent from charging, transfer, and wow fluttering and to improve strength of a magnetic recording medium and to make the surface of a backing layer matted.

In the present invention, a smoothing treatment can be provided after a magnetic coating composition is coated, and heat hardening treatment can be provided if desired.

The present invention is illustrated in more detail by the following Examples and Comparative Examples. In the Examples and Comparative Examples, all parts are by weight.

EXAMPLE 1

| | |
|---|---|
| Te modified $CrO_2$ | 100 parts |
| Te content: 1 atomic % Hc 550 Oe | |
| particle size: 0.9 × 0.13 × 0.13 μm | |
| Urethane resin | 25 parts |
| alcoholic component: | |
| cyclohexane-1,4-dimethanol 70 mol % | |
| butane diol 30 mol % | |
| acid component: | |
| adipic acid 100 mol % | |
| isocyanate component: | |
| diphenylmethane-4,4'-diisocyanate | |
| (15 mol % of the total amounts of | |
| alcohol and acid) | |
| Mn 80,000 $CO_2H$ content 1.0 wt % | |
| Carbon black | 1 part |
| $Cr_2O_3$ (abrasive agent) | 2 parts |
| Stearic acid | 2 parts |
| Amylstearate | 1 part |
| Cyclohexanone | 150 parts |
| Methyl ethyl ketone | 150 parts |

The above described composition was mixed and kneaded and dispersed in a ball mill for 20 hours, then coated on a polyethylene terephthalate support having a thickness of 10 μm using a doctor blade so that the dry thickness of the coated film was 3 μm. The coating was subjected to magnetic orientation using cobalt magnets, and then to smoothing treatment using calendering after drying to remove solvent (100° C. for 1 min). and was slit to a ½ inch width to obtain a sample.

EXAMPLES 2 TO 4 AND COMPARATIVE EXAMPLES 1 TO 4

Samples were prepared in the same manner as in Example 1, except that the polyurethane resin of the binder of Example 1 was changed to those as shown in Table 1.

TABLE 1

| | Alcoholic component | Acid component | Isocyanate component | Polar group | Mn |
|---|---|---|---|---|---|
| Comparative Example 1 | Cyclohexane-1,4-dimethanol 30 mol % Propylene glycol 70 mol % | Adipic acid 100 mol % | Diphenylmethane-4,4'-diisocyanate (15)* | $CO_2H$ 1.0 wt % | 80,000 |
| Comparative Example 2 | Cyclohexane dimethanol 70 mol % Butane diol 30 mol % | Adipic acid 100 mol % | Hexamethylene diisocyanate (15)* | $CO_2H$ 1.0 wt % | 70,000 |
| Comparative Example 3 | Cyclohexane dimethanol 70 mol % Butane diol 30 mol % | Adipic acid 100 mol % | Diphenylmethane-4,4'-diisocyanate (15)* | none | 80,000 |
| Example 2 | Cyclohexane methanol 70 mol % Butane diol 30 mol % | Sebacic acid 100 mol % | Dicyclohexyl-methane-4,4'-diisocyanate (18)* | $SO_3Na$ 0.12 wt % | 50,000 |
| Example 3 | Butane diol 100 mol % | Phthalic acid 70 mol % Adipic acid 30 mol % | Diphenylmethane-4,4'-diisocyanate (12)* | $CO_2H$ 0.5 wt % | 70,000 |
| Example 4 | 2,2-bis(4-hydroxy-ethoxy-phenyl)-propane 60 mol % Butane diol 40 mol % | Phthalic acid 70 mol % Adipic acid 30 mol % | Diphenylmethane-4,4'-diisocyanate (20)* | $SO_3Na$ 0.5 wt % | 100,000 |
| Comparative Example 4 | 2,2-bis(4-hydroxy-ethoxy-phenyl)-propane 60 mol % | Phthalic acid 70 mol % Adipic acid | Diphenylmethane-4,4'-diisocyanate (3)* | $CO_2H$ 1.0 wt % | 50,000 |

TABLE 1-continued

| Alcoholic component | Acid component | Isocyanate component | Polar group | $\overline{Mn}$ |
|---|---|---|---|---|
| Butane diol 40 mol % | 30 mol % | | | |

(Note)
*mol % based on the total amounts of alcoholic component and acid component Regarding durability, electromagnetic properties, running property, and storage stability, the samples were evaluated in the following manner.

Time for still durability

The time for still durability is shown in terms of time for a still image to loose its clarity when certain recorded video signals were reproduced on video tape samples using VHS video tape recorder "NV 8200", manufactured by Matsushita Electric Industrial Co., Ltd.

Video S/N

Grey signals at 50% set up were recorded using the above-describd video tape recorder and noise was measured using S/N meter "925C type" manufactured by Shibasoku Co., Ltd., and is shown in terms of a relative value when a sample of Comparative Example 1 is assumed to have 0 dB.

Kinetic friction coefficient

Using the above-described video tape recorder, the kinetic friction coefficient ($\mu$) was determined by the following formula wherein $T_1$ was tape tension for sending-out side of a rotating cylinder and $T_2$ was tape tension for winding up thereof. Running tension was thus evaluated to determine the $\mu$ value for each sample.

$$T_2/T_1 = \exp(\mu \times \pi)$$

Storage stability

As a test for accelerating long term storage, each sample was allowed to stand under conditions of 60° C. and 90% RH for 3 months, and then kinetic friction coefficient was measured. The results are shown in Table 2.

TABLE 2

| | Time for still durability | Video S/N | Initial Kinetic friction coefficient | Kinetic friction coefficient after 3-month storage |
|---|---|---|---|---|
| Example 1 | 60 min. or more | +2.0 dB | 0.30 | 0.35 |
| Comparative Example 1 | 3 min. | ±0 dB | 0.45 | Running was stopped due to stick-slip |
| Comparative Example 2 | 5 min. | −0.1 dB | 0.50 | 0.62 |
| Comparative Example 3 | 10 min. | −3.0 dB | 0.43 | 0.60 |
| Example 2 | 60 min. or more | +1.3 dB | 0.33 | 0.36 |
| Example 3 | 60 min. or more | +1.5 dB | 0.32 | 0.37 |
| Example 4 | 60 min. or more | +0.3 dB | 0.35 | 0.39 |
| Comparative Example 4 | 1 min. | −2.0 dB | 0.50 | Magnetic layer was peeled apart due to stick-slip |

It is clearly seen from the above results that a magnetic recording medium using a urethane resin of the present invention as a binder exhibits excellent electromagnetic properties, low kinetic friction coefficient, and excellent still durability. It is also confirmed that storage stability is excellent.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing ferromagnetic fine particles dispersed in a binder including a polyurethane resin, wherein the number average molecular weight of said polyurethane resin is from 40,000 to 100,000, containing (1) as a main polymer chain a polyester polyol containing alcoholic and acid components comprising at least one of (A) at least one alcoholic component selected from alicyclic divalent alcohol and aromatic divalent alcohol in an amount of 50 mol% or more based on the total amount of alcoholic components or (B) at least one acid component selected from alicyclic dicarboxylic acid and aromatic dicarboxylic acid in an amount of 50 mol% or more based on the total amount of acid components, and (2) at least one polyisocyanate selected from tolylene diisocyanate, diphenyl-methane-4,4'-diisocyanate, isophrorone diisocyanate, dicyclohexylmethane-4,4'-diisocyanate, and p-phenylene diisocyanate in an amount of 5 mol% or more based on the total amount of all alcoholic components and all acid components, and further containing (3) a polar group selected from —SO$_3$M, —CO$_2$M, and —PO$_3$M$_2$, wherein M represents an H, Na, or K atom, in an amount of from 0.05 to 1.5 wt% based on the total amount of the polyurethane resin.

2. A magnetic recording medium as in claim 1, wherein said alcoholic component is at least one component selected from cyclohexane-1,4-diol, cyclohexane-1,4-dimethanol, and 2,2-bis(4-hydroxyethoxyphenyl)propane.

3. A magnetic recording medium as in claim 1, wherein said acid component is at least one component selected from hexahydrophthalic acid, tetrahydrophthalic acid, phthalic acid, isophthalic acid, and terephthalic acid.

4. A magnetic recording medium as in claim 1, wherein said polar group is at least one of —SO$_3$Na, —SO$_3$K, and —CO$_2$H.

5. A magnetic recording medium as in claim 1, wherein said alcoholic component is contained in an amount of 70 mol% or more based on the total amount of alcoholic components.

6. A magnetic recording medium as in claim 1, wherein said acid component is contained in an amount of 70 mol% or more based on the total amount of acid components.

7. A magnetic recording medium as in claim 1, wherein said polyisocyanate is contained in an amount of from 10 mol% to 30 mol% based on the total amount of all alcoholic components and all acid components.

8. A magnetic recording medium as in claim 1, wherein said polyisocyanate is contained in an amount of from 10 mol% to 20 mol% based on the total amount of all alcoholic components and all acid components.

9. A magnetic recording medium as in claim 1, wherein the polar group content is from 0.08 to 1.2 wt% based on the total amount of the polyurethane resin.

10. A magnetic recording medium as in claim 1, wherein the number average molecular weight of said polyurethane resin is from 30,000 to 150,000.

11. A magnetic recording medium as in claim 1, wherein the polyurethane resin is used in an amount of 20 wt% or more based on the total binder components.

12. A magnetic recording medium as in claim 1, wherein the polyurethane resin is used in an amount of from 35 wt% to 80 wt% based on the total binder components.

* * * * *